(12) United States Patent
Ryder et al.

(10) Patent No.: US 9,521,797 B2
(45) Date of Patent: *Dec. 20, 2016

(54) SYSTEM AND METHOD FOR DETERMINING GROUND ENGAGING TOOL POSITION BASED ON FLUID PRESSURE

(71) Applicant: CNH Industrial Canada, Ltd., Saskatoon (CA)

(72) Inventors: Nicholas George Alfred Ryder, Saskatoon (CA); Cory Adrian Yuen, Martensville (CA); Anthony Charles Rapley, Saskatoon (CA); Michael J. Bloom, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 106 days.

This patent is subject to a terminal disclaimer.

(21) Appl. No.: 14/177,092

(22) Filed: Feb. 10, 2014

(65) Prior Publication Data

US 2014/0156154 A1    Jun. 5, 2014

Related U.S. Application Data

(62) Division of application No. 13/725,186, filed on Dec. 21, 2012, now Pat. No. 8,688,333, which is a division
(Continued)

(51) Int. Cl.
*A01B 49/06* (2006.01)
*A01B 63/32* (2006.01)
(Continued)

(52) U.S. Cl.
CPC ............. *A01B 63/002* (2013.01); *A01B 49/06* (2013.01); *A01B 63/32* (2013.01); *A01C 7/203* (2013.01); *A01C 21/00* (2013.01)

(58) Field of Classification Search
CPC ......... A01B 49/06; A01B 49/04; A01B 49/00; A01B 63/32; A01B 63/24; A01B 63/14; A01B 63/00; A01B 63/002; A01C 7/203; A01C 7/201; A01C 7/20; A01C 7/00; A01C 21/00
(Continued)

(56) References Cited

U.S. PATENT DOCUMENTS 4,125,166 A    11/1978  Bergius
4,277,898 A     7/1981  Flippin
(Continued)

FOREIGN PATENT DOCUMENTS

DE    4222108    1/1994
EP    0573740    12/1993
(Continued)

*Primary Examiner* — Christopher J Novosad
(74) *Attorney, Agent, or Firm* — Rebecca L. Henkel

(57) ABSTRACT

An agricultural implement is provided that includes a ground engaging tool configured to engage soil in a working position and to disengage the soil in a non-working position. The agricultural implement also includes an actuating cylinder coupled to the ground engaging tool and configured to transition the ground engaging tool between the working position and the non-working position based on a flow of fluid from a fluid supply system. In addition, the agricultural implement includes at least one sensor configured to output a signal indicative of a fluid pressure within the fluid supply system, and a controller configured to determine whether the ground engaging tool is in the working position or the non-working position based on the first signal.

11 Claims, 4 Drawing Sheets

Related U.S. Application Data of application No. 12/728,724, filed on Mar. 22, 2010, now Pat. No. 8,346,442.

(51) Int. Cl.
  *A01B 63/00* (2006.01)
  *A01C 7/20* (2006.01)
  *A01C 21/00* (2006.01)

(58) Field of Classification Search
  USPC .......... 701/50; 111/200; 172/1–12, 810–834, 172/776
  See application file for complete search history.

(56) References Cited

U.S. PATENT DOCUMENTS

| | | | |
|---|---|---|---|
| 4,834,461 A | 5/1989 | Fidler et al. | |
| 4,900,093 A | 2/1990 | Krone et al. | |
| 4,942,004 A * | 7/1990 | Catanzaro | 264/40.5 |
| 6,003,455 A | 12/1999 | Flamme et al. | |
| 6,863,006 B2 | 3/2005 | Sandoval et al. | |
| 7,062,350 B2 | 6/2006 | Peterson | |
| 8,346,442 B2 * | 1/2013 | Ryder et al. | 701/50 |
| 8,688,333 B2 * | 4/2014 | Ryder et al. | 701/50 |
| 2003/0110995 A1 * | 6/2003 | Hall | A01B 73/02 111/52 |
| 2006/0096435 A1 | 5/2006 | Stein et al. | |
| 2008/0023931 A1 * | 1/2008 | Myers | B60G 11/28 280/124.157 |

FOREIGN PATENT DOCUMENTS

| | | | |
|---|---|---|---|
| GB | 2015199 | 9/1979 | |
| JP | 6189608 | 7/1994 | |
| WO | WO 2008084367 A2 * | 7/2008 | F15B 9/09 |

* cited by examiner

US 9,521,797 B2

SYSTEM AND METHOD FOR DETERMINING GROUND ENGAGING TOOL POSITION BASED ON FLUID PRESSURE

CROSS REFERENCE TO RELATED APPLICATIONS

This application is a divisional of U.S. patent application Ser. No. 13/725,186, entitled "SYSTEM AND METHOD FOR DETERMINING GROUND ENGAGING TOOL POSITION BASED ON FLUID PRESSURE", filed Dec. 21, 2012, which is a divisional of U.S. patent application Ser. No. 12/728,724, entitled "SYSTEM AND METHOD FOR DETERMINING GROUND ENGAGING TOOL POSITION BASED ON FLUID PRESSURE" filed Mar. 22, 2010 (now U.S. Pat. No. 8,346,442). Each of the foregoing applications is hereby incorporated by reference in its entirety.

BACKGROUND

The invention relates generally to ground working equipment, such as agricultural equipment, and more specifically, to an implement configured to determine a position of ground engaging tools by measuring fluid pressure within cylinders that control the position of the ground engaging tools.

Generally, seeding implements are towed behind a tractor or other work vehicle via a mounting bracket secured to a rigid frame of a planter or seeder. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, the openers may be capable of transitioning between a working position and a non-working position. For example, after completion of a seed row, the openers may be transitioned to the non-working position in which the openers disengage the soil. Consequently, seeds will not be deposited within the soil as the implement is turned at a headland of a field, for example. Once the implement is aligned with the edge of a previously planted swath of soil, the openers may be transitioned to the working position in which the openers engage the soil.

As will be appreciated, it may be desirable to terminate a flow of product (e.g., seeds, fertilizer, etc.) to the openers while the openers are in the non-working position. In certain configurations, a farmer may manually engage and disengage the flow of product. Alternatively, an electronic work switch may be employed to automatically regulate the flow of product based on the position of the openers. For example, in certain configurations, the openers are coupled to an implement frame which rotates between the working and non-working positions. The electronic work switch may be coupled to the frame and configured to monitor the rotation to determine the position of the openers. For example, the electronic work switch may send a signal indicative of frame position to a controller configured to regulate the flow of product based on the signal. However, certain seeding implements include a fixed frame and openers configured to individually transition between the working and non-working positions. In such configurations, coupling an electronic work switch to each opener for position determination may be excessively complex and costly.

BRIEF DESCRIPTION

The present invention provides an implement including a controller configured to determine a position of ground engaging tools based on fluid pressure supplied to actuating cylinders configured to transition the ground engaging tools between a working position and a non-working position. In an exemplary embodiment, the agricultural implement includes a ground engaging tool configured to engage soil in a working position and to disengage the soil in a non-working position. The implement also includes an actuating cylinder coupled to the ground engaging tool and configured to transition the ground engaging tool between the working position and the non-working position based on a flow of fluid from a fluid supply system. In addition, the implement includes at least one sensor configured to output a signal indicative of a fluid pressure within the fluid supply system, and a controller configured to determine whether the ground engaging tool is in the working position or the non-working position based on the signal. Certain configurations may include multiple ground engaging tools and a corresponding number of actuating cylinders. By measuring the fluid pressure within the fluid supply system, the position of the ground engaging tools may be determined without coupling individual switches to each tool, thereby reducing manufacturing costs and complexity.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
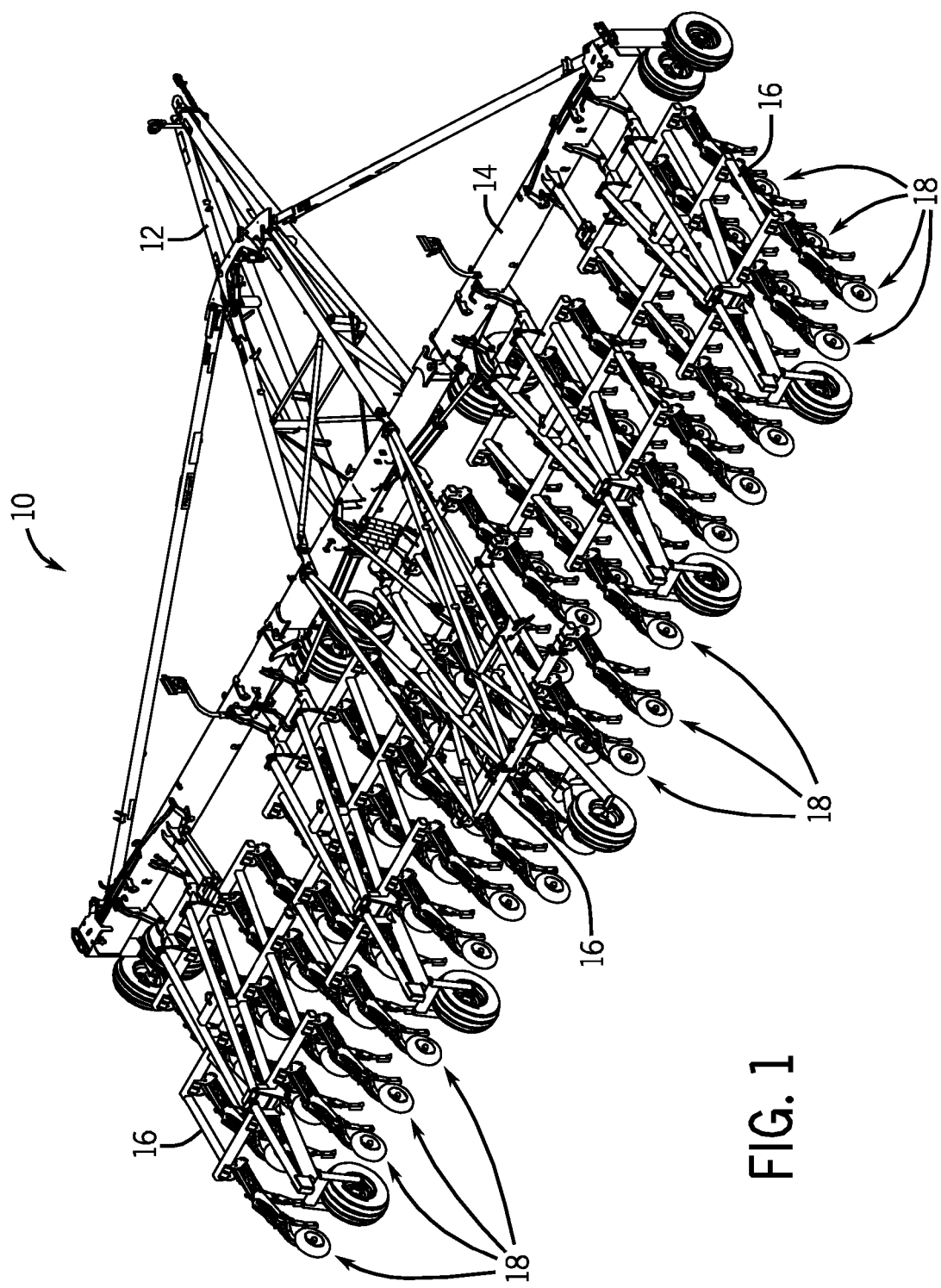
FIG. 1 is a perspective view of an implement including a controller configured to determine a position of ground engaging tools based on fluid pressure supplied to actuating cylinders configured to transition the ground engaging tools between a working position and a non-working position.

Turning now to the drawings, FIG. 1 is a perspective view of a seeding implement 10. The implement 10 is designed to be towed behind a work vehicle such as a tractor. The implement 10 includes a tow bar assembly 12 which is shown in the form of an A-frame hitch assembly. The tow bar assembly 12 may include a hitch used to attach to an appropriate tractor hitch via a ball, clevis, or other coupling. The tow bar assembly 12 is coupled to a tool bar 14 which supports multiple tool frames 16. Each tool frame 16 includes multiple seeding implements, such as the illustrated hoe openers 18. As discussed in detail below, each hoe opener 18 includes an actuating cylinder configured to vary a working position of a ground engaging tool coupled to the hoe opener 18. In the present embodiment, the actuating cylinders are supplied by conduits extending from a fluid power supply. Pressure sensors coupled to the conduits are configured to measure fluid pressure and to send a signal to a controller indicative of the pressure within each conduit. The controller, in turn, is configured to determine a working position of the openers based on the signal. In this manner, a flow of product (e.g., seeds, fertilizer, etc.) to each of the hoe openers 18 may be automatically initiated when the openers 18 are in the working position, and automatically terminated when the openers 18 are in the non-working position.

Figure 2:
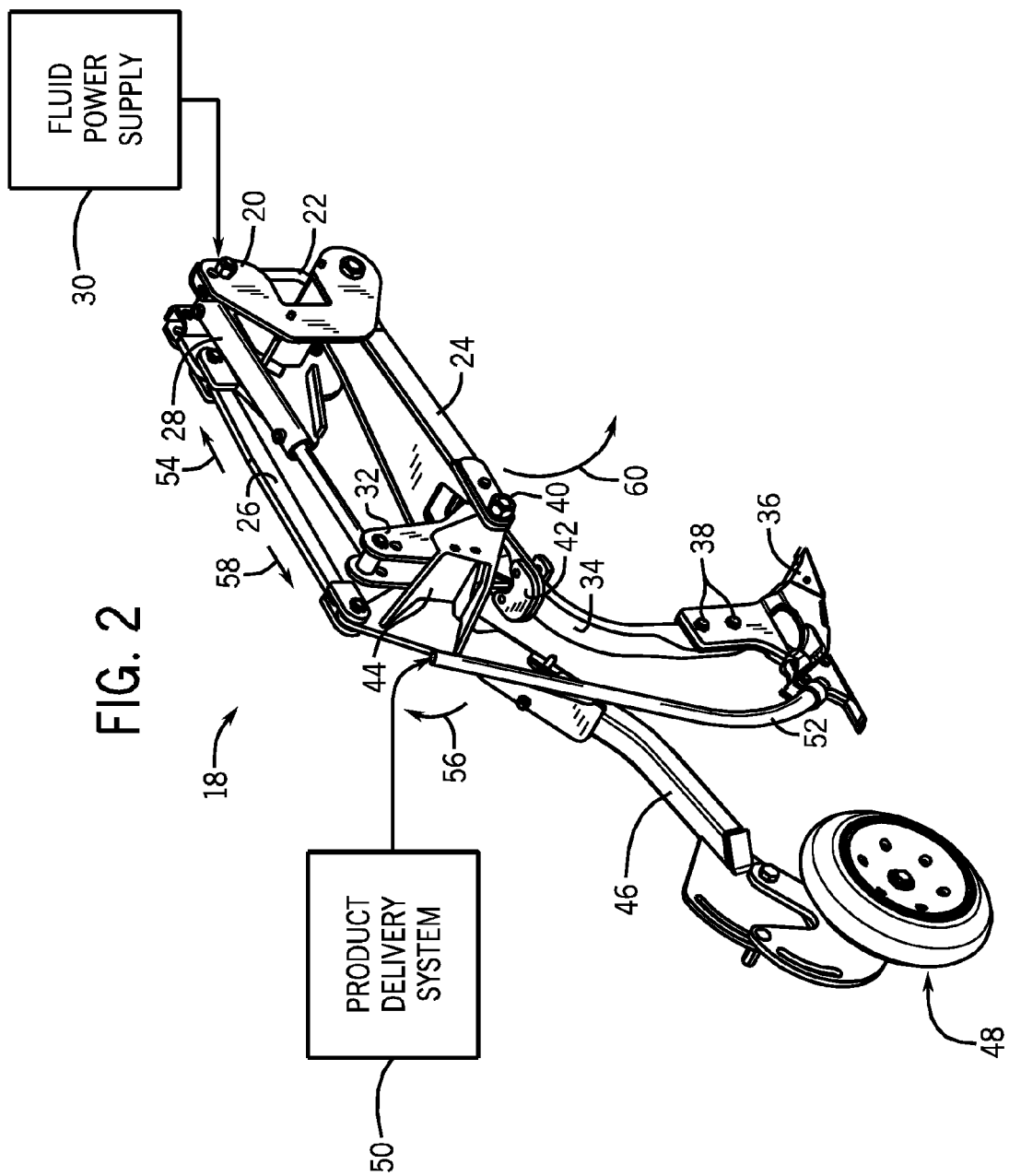
FIG. 2 is a perspective view of an exemplary hoe opener having an actuating cylinder configured to transition the ground engaging tool between the working position and the non-working position.

FIG. 2 is a perspective view of an exemplary hoe opener 18 having an actuating cylinder configured to transition a ground engaging tool between a working position and a non-working position. As will be appreciated, the hoe opener 18 is a type of row unit, which may be placed on an agricultural implement, such as the seeding implement 10 shown in FIG. 1. As illustrated, the hoe opener 18 includes a frame support 20, mounting brackets 22, a first member 24, a second member 26, and a biasing member such as an actuating cylinder 28 (e.g., hydraulic and/or pneumatic piston-cylinder assembly). The cylinder 28 may be fluidly coupled to a power supply 30 that provides a flow of pressurized fluid which displaces a piston rod extending from the cylinder. It should be appreciated that the fluid supply system may be hydraulic or pneumatic, thereby powering the hydraulic or pneumatic cylinder 28. The frame support 20 and frame bracket 22 are configured to interface with the tool frame 16, thereby securing the hoe opener 18 to the seeding implement 10. For instance, multiple hoe openers 18 may be mounted in parallel along the tool frame 16. In the present configuration, the first member 24, the second member 26, and the frame support 20 form elements of a parallel linkage, also known as a four bar linkage. As will be appreciated, components of the hoe opener 18, such as the frame support 20, mounting brackets 22, first member 24, and second member 26, may be made of any suitable material, such as steel.

The cylinder 28 is attached to a shank adapter 32 via a pin at the end of the piston rod. The shank adapter 32 is also coupled to a shank 34 and a ground engaging tool 36. The ground engaging tool 36 is coupled to the shank 34 via fasteners 38, which enable height adjustment of the ground engaging tool 36 such that seeding depth may be varied. A pin 40 is coupled to the first member 24 and shank adapter 32, enabling the shank adapter 32 to pivotally rotate about the pin 40 as the cylinder 28 extends and retracts. Accordingly, the ground engaging tool 36 moves in a downward or upward direction based upon extension or retraction of the cylinder 28. The shank adapter 32 may feature several holes to receive a pin coupling the end of the cylinder 28 to the adapter 32. The adapter holes may be used to adjust the angle of the cylinder 28 with respect to the parallel linkage assembly, thereby changing the angle and magnitude of cylinder forces.

Upward movement of the ground engaging tool 36 may be limited by contact between a stop plate 42 and a rear frame 44. In the present embodiment, partially relieving pressure to a cap end of the cylinder 28 may reduce the downward force applied by a packer wheel assembly 46. In addition, applying pressure to a rod end of the cylinder 28 will raise the packer wheel assembly 46, and will eventually lift the packing wheel 48 from the terrain. In the present embodiment, the packer wheel assembly 46 may facilitate height adjustment of the packer wheel 48, in the form of a fastener and slot or an equivalent structure. In some cases, the resulting lifting force may compensate for an increased packing force, caused by terrain elevation changes, thereby increasing seeding accuracy. To facilitate seed deposition during operation, the ground engaging tool 36 is coupled to a product delivery system 50 via a tube 52.

As a result of this exemplary hoe opener configuration, the ground engaging tool 36 may be transitioned between a working position and a non-working position based on extension and retraction of the cylinder 28. As previously discussed, retraction of the cylinder 28 along a direction 54 induces the ground engaging tool 36 to rotate in an upward direction 56, thereby extracting the ground engaging tool 36 from the soil, and transitioning the tool 36 into a non-working or transport position. Positioning each ground engaging tool 36 in the non-working position facilitates transport of the seeding implement 10 because the ground engaging tool 36 of each hoe opener 18 is no longer in contact with the soil. In addition, as discussed in detail below, a flow of product (e.g., seeds, fertilizer, etc.) to the hoe openers 18 may be temporarily suspended when the ground engaging tools 36 are in the non-working position. Consequently, the seeding implement 10 may be moved across a field (e.g., turned at a headland) without depositing product within the soil.

Conversely, each ground engaging tool 36 may be transitioned into the working position by extending the cylinder 28 in a direction 58, thereby driving the ground engaging tool 36 to rotate in a direction 60. As will be appreciated, while the ground engaging tool 36 is in the working position, the tool 36 may excavate a trench into the soil as the implement 10 is moved across the field. Once a trench has been excavated, the product delivery system 50 may deposit seeds and/or fertilizer into the soil via the tube 52. The packer wheel 48 may then close the trench, thereby forming a seed row suitable for crop development.

As discussed in detail below, fluid conduits may be routed from the fluid power supply 30 to each of the cylinders 28 in a parallel flow arrangement. For example, a first conduit may extend to a first side of each cylinder 28 and a second conduit may extend to a second side. In such a configuration, applying fluid pressure to the first conduit will induce each cylinder 28 to extend, while applying fluid pressure to the second conduit will induce each cylinder 28 to retract. Monitoring the fluid pressure within the first and/or second conduits may indicate whether the cylinders 28 are extending or retracting. Because extension and retraction of the cylinders 28 determines the position of the ground engaging tools 36, the fluid pressure level may be utilized to determine whether the ground engaging tools 36 are in the working position or the non-working position. In certain embodiments, a flow of product to the hoe openers 18 may be automatically initiated when the ground engaging tools 36 are in the working position, and automatically terminated when the ground engaging tools 36 are in the non-working position.

Figure 3:
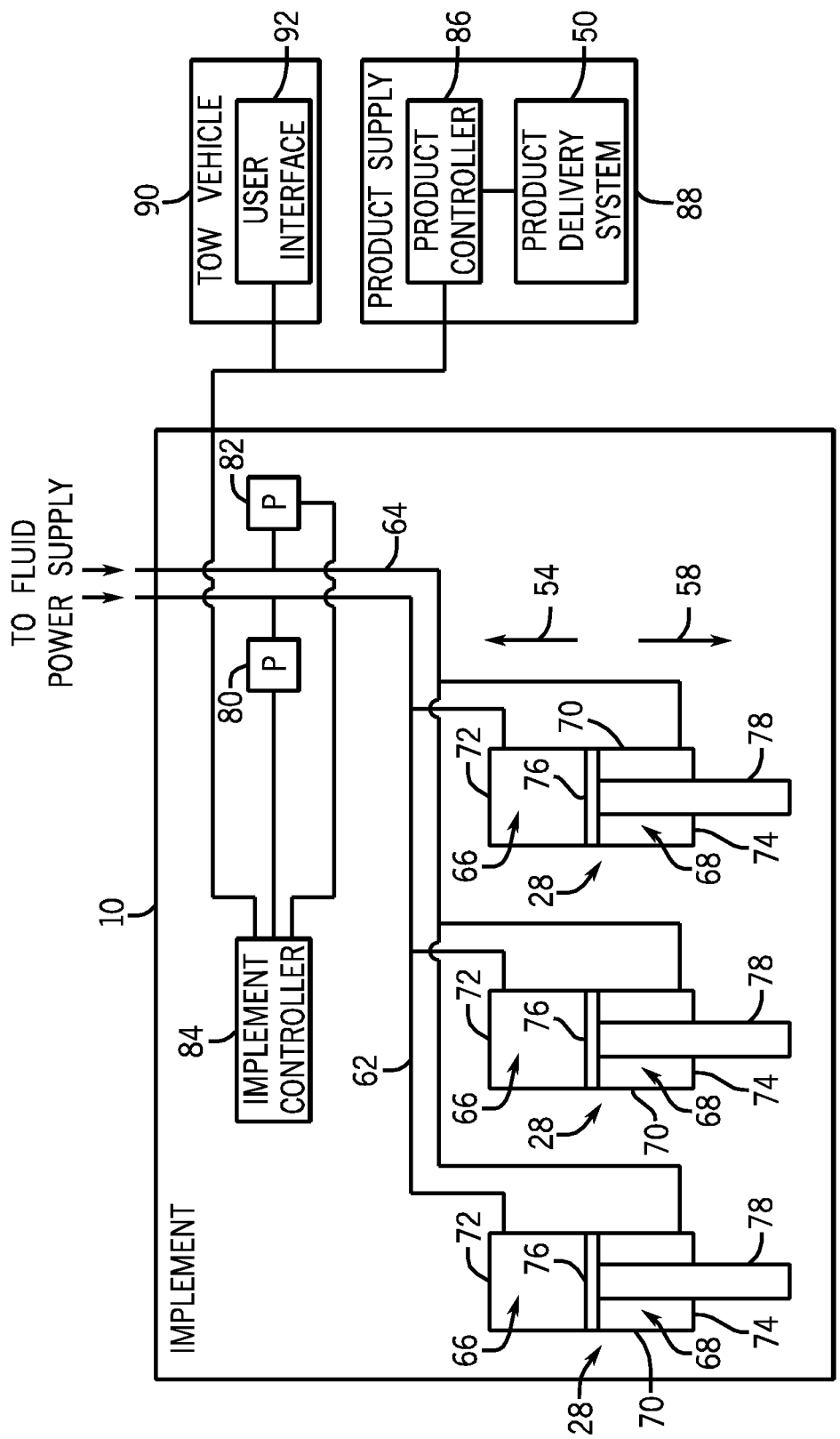
FIG. 3 is a schematic view of an exemplary implement including a controller and fluid pressure sensors configured to determine the position of the ground engaging tools.

FIG. 3 is a schematic view of an exemplary implement 10 including a controller and fluid pressure sensors configured to determine the position of the ground engaging tools 36. As illustrated, a first fluid conduit 62 and a second fluid conduit 64 extend from the fluid power supply 30 to each actuating cylinder 28. While three actuating cylinders 28 are illustrated, it should be appreciated that more or fewer cylinders 28 may be employed within the implement 10. For example, in certain configurations, one actuating cylinder 28 may be employed for each hoe opener 18 to transition each ground engaging tool 36 between the working and non-working positions. In alternative embodiments, a single actuating cylinder 28 may be employed to transition the entire implement 10 between the working and non-working positions by rotating the implement in an upward direction, for example. In further embodiments, one actuating cylinder 28 may be coupled to each tool frame 16 and configured to rotate each tool frame 16 about the tool bar 14 to transition the hoe openers 18 between the working and non-working positions. In each embodiment, the cylinders 28 may be arranged in a parallel flow configuration in which each cylinder 28 is directly coupled to the fluid power supply 30 by the first conduit 62 and the second conduit 64. In other words, fluid does not flow from one cylinder 28 to another in a serial flow configuration.

As illustrated, the first fluid conduit 62 is coupled to a first side of each cylinder 28, while the second fluid conduit 64 is coupled to a second side of each cylinder 28. In the present embodiment, the first fluid conduit 62 is coupled to a cap side 66 of the cylinder 28, and the second fluid conduit 64 is coupled to a rod side 68 of the cylinder 28. Consequently, applying fluid pressure to the first conduit 62 induces the cylinder 28 to extend in the direction 58, while applying fluid pressure to the second conduit 64 induces the cylinder 28 to retract in the direction 54. It should be appreciated that in alternative embodiments, the cylinder 28 may be reversed such that the first fluid conduit 62 is coupled to the rod side 68, and the second fluid conduit 64 is coupled to the cap side 66. In such an embodiment, applying fluid pressure to the first fluid conduit 62 will induce the cylinder 28 to retract in the direction 54, while applying fluid pressure to the second conduit 64 will induce the cylinder 28 to extend in the direction 58.

As illustrated, the actuating cylinders 28 include a barrel 70 having an end cap 72, a gland 74, and a piston 76. As will be appreciated, the cap end 66 is defined by a volume formed from the piston 76, barrel 70 and end cap 72, while the rod end 68 is defined by a volume formed from the piston 76, barrel 70 and gland 74. Furthermore, a rod 78 is coupled to the piston 76 such that movement of the piston 76 drives the rod 78 to translate in the direction 54 and/or 58. As will be further appreciated, various seals may be employed between the rod 78 and the gland 74 to block a flow of fluid from exiting the cylinder 28. In addition, the piston 76 includes additional seals to block a flow of fluid between the cap side 66 and the rod side 68 of the cylinder 28. In the present embodiment, applying fluid pressure to the first conduit 62 increases pressure to the cap side 66 of the cylinder 28, thereby driving the piston 76 and the rod 78 in the direction 58. Conversely, applying fluid pressure to the second conduit 64 increases pressure to the rod side 68 of the cylinder 28, thereby driving the piston 76 and the rod 78 in the direction 54. It should be appreciated that increasing pressure to one conduit may be accompanied by a decrease is pressure to the other conduit to facilitate movement of the piston 76 within the barrel 70. It should further be appreciated that the cylinders 28 may be particularly configured to operate based on pneumatic or hydraulic fluid pressure.

As previously discussed, extending the cylinder 28 in the direction 58 induces the ground engaging tool 36 to rotate in the downward direction 60, thereby engaging the soil. Consequently, increasing fluid pressure to the first conduit 62 and decreasing fluid pressure to the second conduit 64 causes the ground engaging tool 36 to transition to the working position. Conversely, retracting the cylinder 28 in the direction 54 induces the ground engaging tool 36 to rotate in the upward direction 56, thereby disengaging the soil. Therefore, increasing fluid pressure to the second conduit 64 and decreasing fluid pressure to the first conduit 62 causes the ground engaging tool 36 to transition to the non-working position. As a result, monitoring the pressures within the first conduit 62 and the second conduit 64 may provide an indication of whether the ground engaging tool 36 is transitioning to the working position or the non-working position.

The present embodiment includes a first pressure sensor 80 coupled to the first conduit 62, and a second pressure sensor 82 coupled to the second conduit 64. The pressure sensors 80 and 82 are configured to monitor the fluid pressure within the conduits 62 and 64, respectively. As will be appreciated, the pressure sensors 80 and 82 may include any suitable pressure sensor configuration, such as a fiber optic sensor, a mechanical deflection sensor, a piezoelectric sensor, or a microelectromechanical systems (MEMS) sensor, among others. In certain embodiments, each sensor 80 and/or 82 may be representative of multiple sensors (e.g., 1, 2, 3, 4, 5, 6, or more) configured to measure fluid pressure within one or more areas of the respective conduits 62 and/or 64. In the present embodiment, the pressure sensors 80 and 82 are positioned sufficiently upstream of the cylinders 28 such that the sensors 80 and 82 measure the aggregate pressure within the first conduit 62 and the second conduit 64. In this manner, pressure variations between cylinders 28 may be equalized prior to being measured by the sensors 80 and 82. As illustrated, the pressure sensors 80 and 82 are communicatively coupled to an implement controller 84, and configured to send a signal to the implement controller 84 indicative of the pressure within the conduits 62 and 64.

The implement controller 84 is configured to determine whether the ground engaging tools 36 are in the working position or the non-working position based on the signal transmitted by the sensors 80 and 82. In certain embodiments, the implement controller 84 may be configured to detect a pressure increase within the first conduit 62 or the second conduit 64 to determine the position of the ground engaging tools 36. For example, an operator may transition the ground engaging tools 36 to the working position by increasing a pressure to the first conduit 62 and decreasing a pressure to the second conduit 64 (e.g., by adjusting a directional control valve within the tow vehicle). Consequently, the first sensor 80 will detect an increase in pressure within the first conduit 62, and send a signal to the controller 84 indicative of the pressure increase. The controller 84 will then compare the pressure detected within the first conduit 62 to a threshold value indicative of the ground engaging tools 36 transitioning to the working position. If the detected pressure is greater than the threshold value, the controller 84 will output a signal indicating that the ground engaging tools 36 are transitioning to the working position.

Similarly, the operator may transition the ground engaging tools 36 to the non-working position by increasing a pressure to the second conduit 64 and decreasing a pressure to the first conduit 62. Consequently, the second sensor 82 will detect an increase in pressure within the second conduit 64, and send a signal to the controller 84 indicative of the pressure increase. The controller 84 will then compare the pressure detected within the second conduit 64 to a threshold value indicative of the ground engaging tools 36 transitioning to the non-working position. If the detected pressure is greater than the threshold value, the controller 84 will output a signal indicating that the ground engaging tools 36 are transitioning to the non-working position.

Monitoring a pressure increase within the fluid conduits 62 and 64, or within a portion of the fluid circuit in communication with the conduits, may identify the transition between positions shortly after an operator initiates the transition. For example, when the ground engaging tools 36 are in the working position, the tools 36 are disposed within the soil. Consequently, as fluid is supplied to the rod end 68 of the cylinders 28 during a transition to the non-working position, pressure within the second conduit 64 increases rapidly due to lifting the ground engaging tools 36 out of the soil. In certain configurations, the threshold value indicative of a transition to the non-working position may be lower than a pressure sufficient to lift the ground engaging tools 36 from the soil. As a result, the controller 84 may detect the transition to the non-working position prior to the ground engaging tools 36 disengaging the soil. As discussed in detail below, detecting the transition to the non-working position shortly after the transition is initiated may enable the product delivery system 50 to disengage the flow of product prior to completion of the transition, thereby substantially reducing or eliminating the possibility of dispensing product with the ground engaging tools 36 in the non-working position.

Similarly, when the ground engaging tools 36 are in the non-working position, the tools 36 are positioned above the soil. Consequently, as fluid is supplied to the cap end 66 of the cylinders 28 during a transition to the working position, pressure within the first conduit 62 increases rapidly due to resistance between the ground engaging tools 36 and the soil as the ground engaging tools 36 contact the soil. In certain configurations, the threshold value indicative of a transition to the working position may be lower than a pressure sufficient to drive the ground engaging tools 36 into the soil. As a result, the controller 84 may detect the transition to the working position prior to the ground engaging tools 36 engaging the soil. As discussed in detail below, detecting the transition to the working position shortly after the transition is initiated may enable the product delivery system 50 to engage the flow of product prior to completion of the transition, thereby ensuring that product flow from the ground engaging tools 36 commences as soon as the tools 36 are in the proper position for product deposition.

In alternative embodiments, a single pressure sensor 80 or 82 may be employed to detect the transition between the working position and the non-working position. For example, in certain embodiments, only the first pressure sensor 80 may be utilized to measure pressure within the first conduit 62. As previously discussed, during a transition to the working position, the pressure increases within the first conduit 62 and decreases within the second conduit 64. Conversely, during a transition to the non-working position, the pressure decreases within the first conduit 62 and increases within the second conduit 64. Consequently, the first pressure sensor 80 may send a signal to the implement controller 84 indicative of a pressure increase during the transition to the working position, and a pressure decrease during a transition to the non-working position. The controller 84 may compare the pressure within the first conduit 62 to a minimum threshold value to determine whether the ground engaging tools 36 are transitioning to the non-working position, and compare the pressure within the first conduit 62 to a maximum threshold value to determine whether the ground engaging tools 36 are transitioning to the working position. In this manner, a single sensor 80 may be employed to determine the position of the ground engaging tools 36. In further embodiments, a single sensor 82 coupled to the second fluid conduit 64 may be utilized to determine the position of the ground engaging tools 36 in a similar manner.

In certain embodiments, the controller 84 may not only compare the pressure within the first conduit 62 and/or the second conduit 64 to a threshold value, but also verify that the pressure remains outside of the threshold value for a threshold duration before sending a signal indicative of the transition. For example, if the pressure sensor 80 detects a pressure increase within the first fluid conduit 62, the controller 84 may delay sending a signal indicative of a transition to the working position until the pressure remains outside of the threshold value for a particular duration. Such a configuration may substantially reduce or eliminate the possibility of the controller 84 sending an inaccurate signal identifying the position of the ground engaging tools 36. For example, if a ground engaging tool 36 encounters an obstacle within the soil (e.g., rock, root, etc.), the tool 36 may rotate toward the non-working position. However, once the obstacle has been cleared, the tool 36 will rotate back to the working position. In such situations, the controller 84 may continuously output a signal indicative of the tools 36 being within the working position due to the signal delay. Such a configuration may ensure that a continuous supply of product is provided to the hoe openers 18 even if one or more ground engaging tools 36 encounter an obstacle.

As illustrated, the implement controller 84 is communicatively coupled to a product controller 86 within a product supply 88. The product supply 88 includes the previously discussed product delivery system 50 configured to deliver product (e.g., seeds, fertilizer, etc.) to the hoe openers 18. Once the implement controller 84 determines that a transition has occurred, the implement controller 84 will send a signal to the product controller 86 indicative of the position of the ground engaging tools 36. The product controller 86 will then adjust the flow of product from the product delivery system 50 to the hoe openers 18. For example, if the pressure within the first conduit 62 increases above the threshold value for a threshold duration, the implement controller 84 may send a signal to the product controller 86 indicating that the ground engaging tools 36 are transitioning to the working position. The product controller 86 may then engage the product delivery system 50, thereby providing the hoe openers 18 with product. It should be appreciated, that there may be a time delay between activation of the product delivery system 50 and flow of product from the ground engaging tools 36. As previously discussed, the controller 84 may be capable of detecting a transition to the working position prior to the ground engaging tools 36 reaching a proper depth for product deposition. In certain embodiments, the time between detection of the transition and reaching the proper depth may be substantially equal to the time delay between activation of the product delivery system 50 and flow of product from the ground engaging tools 36. As a result, product may be dispensed from the hoe openers 18 as soon as the ground engaging tools 36 are in position, thereby substantially reducing or eliminating wasted product that may be delivered to an improper depth.

Similarly, if the pressure within the second conduit 64 increases above the threshold value for a threshold duration, the implement controller 84 may send a signal to the product controller 86 indicating that the ground engaging tools 36 are transitioning to the non-working position. The product controller 86 may then disengage the product delivery system 50, thereby stopping the flow of product to the hoe openers 18. Similar to the time delay described above, it should be appreciated that there may be a time delay between deactivation of the product delivery system 50 and termination of product flow from the ground engaging tools 36. As previously discussed, the controller 84 may be capable of detecting a transition to the non-working position prior to the ground engaging tools 36 leaving the soil. In certain embodiments, the time between detection of the transition and extraction from the soil may be substantially equal to the time delay between deactivation of the product delivery system 50 and termination of flow from the ground engaging tools 36. As a result, product flow may be terminated prior to the ground engaging tools 36 disengaging the soil, thereby substantially reducing or eliminating wasted product that may be delivered to an improper depth.

In the present embodiment, product flow is also regulated by an operator within a tow vehicle 90. Specifically, the operator may select a product delivery mode via a user interface 92 which is communicatively coupled to the implement controller 84 and the product controller 86. For example, the operator may initiate a product delivery mode such that the product controller 86 may automatically engage or disengage the flow of product to the hoe openers 18 based on the position of the ground engaging tools 36. Alternatively, the operator may disengage the product delivery mode such that product is not dispensed from the product delivery system 50 regardless of ground engaging tool position. In certain embodiments, the operator, via interaction with the user interface 92, may manually control the flow of product. Such a configuration may ensure that a proper flow of product is provided to the hoe openers 18 during each phase of planting and/or seeding operations.

Figure 4:
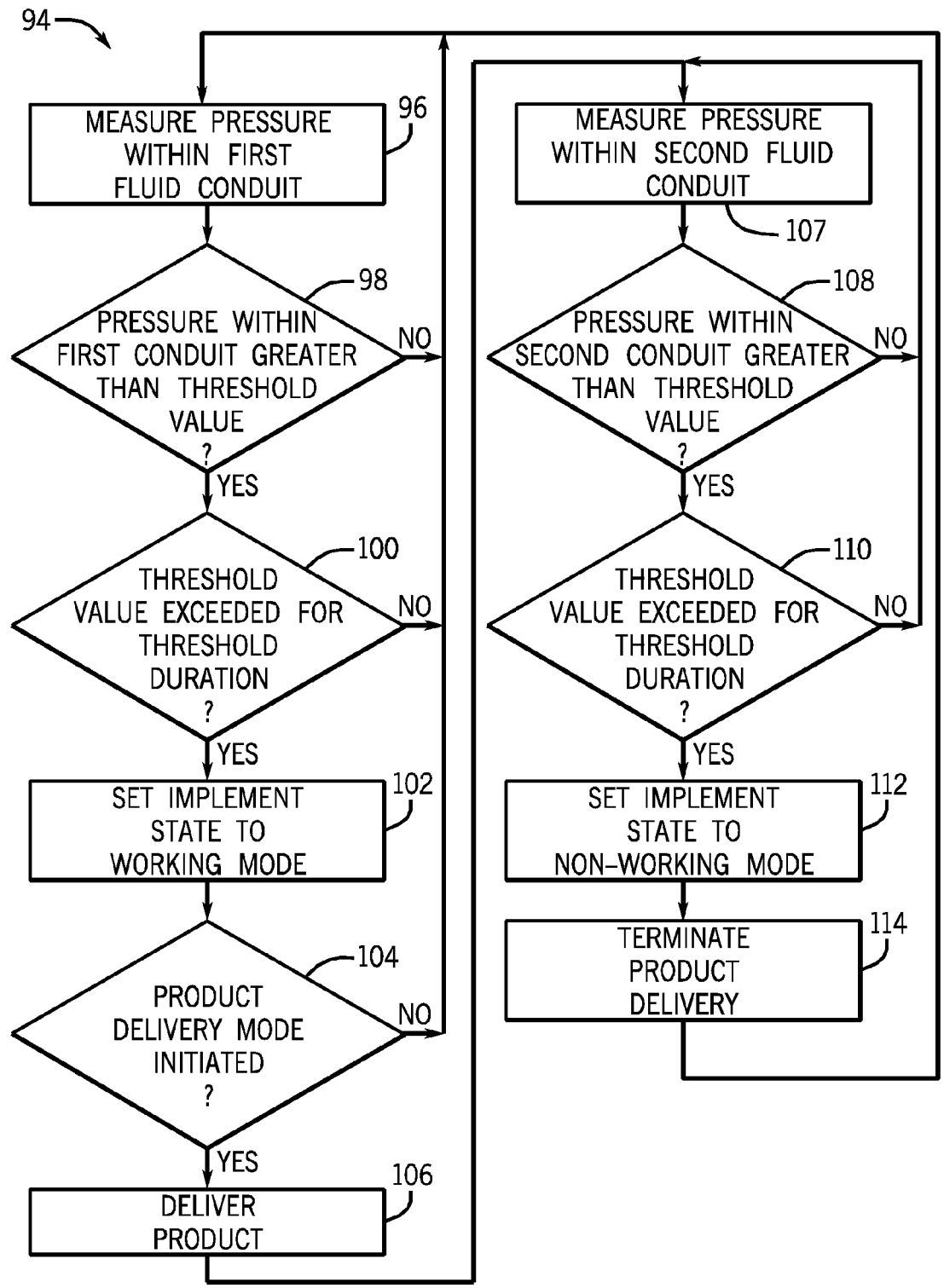
FIG. 4 is a flow diagram of an exemplary method of operating the implement to automatically regulate a flow of product to the ground engaging tools based on measurement of fluid pressure.

FIG. 4 is a flow diagram of an exemplary method 94 of operating the implement 10 to automatically regulate a flow of product to the ground engaging tools 36 based on measurement of fluid pressure. First, as represented by block 96, pressure within the first fluid conduit 62 is measured. As previously discussed, the position of the ground engaging tools 36 may be determined by measuring the fluid pressure within the first conduit 62, the second conduit 64, or a combination of the two conduits 62 and 64. While the presently illustrated method 94 measures fluid pressure within both conduits 62 and 64, it should be appreciated that alternative embodiments may measure fluid pressure within a single conduit 62 or 64.

Next, as represented by block 98, the measured pressure within the first conduit 62 is compared to a threshold value indicative of a transition to the working position. If the pressure within the first conduit 62 is greater than the threshold value, the method 94 proceeds to step 100 in which the length of time the pressure exceeds the threshold value is compared to a threshold duration. If the pressure within the first conduit 62 exceeds the threshold value for the threshold duration, the implement state is set to the working mode, as represented by block 102. As previously discussed, an operator may initiate a product delivery mode via a user interface 92 within the tow vehicle 90. As represented by block 104, if the product delivery mode is initiated, product is delivered to the ground engaging tools 36, as represented by block 106.

Product flow may be terminated once the ground engaging tools 36 are transitioned to the non-working position. As previously discussed, an increase in pressure within the second conduit 64 may be indicative of a transition to the non-working position. Consequently, as represented by block 107, pressure within the second conduit 64 is measured, and the pressure is compared to a threshold value indicative of a transition to the non-working position, as represented by block 108. If the pressure within the second conduit 64 is greater than the threshold value, the method 94 proceeds to step 110 in which the length of time the pressure exceeds the threshold value is compared to a threshold duration. If the pressure within the second conduit 64 exceeds the threshold value for the threshold duration, the implement state is set to the non-working mode, as represented by block 112. Next, as represented by block 114, product delivery to the ground engaging tools 36 is terminated. The method 94 then proceeds to block 96, where the process repeats.

While the present method 94 determines whether the ground engaging tools 36 are transitioning to the working position based on the pressure within the first conduit 62, it should be appreciated that alternative embodiments may utilize the pressure within the second conduit 64. For example, a pressure decrease within the second conduit 64 may be indicative of a transition to the working position. Consequently, certain embodiments may utilize the pressure within the second conduit 64 to determine whether the ground engaging tools 36 are transitioning to the working position. In addition, while the present method 94 determines whether the ground engaging tools 36 are transitioning to the non-working position based on the pressure within the second conduit 64, it should be appreciated that alternative embodiments may utilize the pressure within the first conduit 62. For example, a pressure decrease within the first conduit 62 may be indicative of a transition to the non-working position. Consequently, certain embodiments may utilize the pressure within the first conduit 62 to determine whether the ground engaging tools 36 are transitioning to the non-working position.

In further embodiments, the steps 100 and/or 110 may be omitted such that the implement state is set to the working mode or non-working mode without the latency associated with comparing the exceeded threshold value to the threshold duration. Such embodiments may facilitate faster transitions between modes, but may not account for incidental contact between ground engaging tools 36 and an obstacle within the soil. Yet further embodiments may omit the steps of delivering product, as represented by block 106, and terminating product delivery, as represented by block 114. For example, instead of directly regulating the flow of product to the ground engaging tools 36, the method may store the position of the ground engaging tools 36 within a data logger for later analysis and/or provide an indication to the operator of tool position via the user interface 92.

It should be noted that while the foregoing description referred to determining pressures within the fluid conduits, that term should be understood as including any one of the number of fluid conveying components between the pump and the cylinder. That is, pressure may be sensed in directional control or other valving, in fittings, including dedicated pressure sensor fittings, metal tubing or soft hoses, and at the cylinder itself. Certain of these may be favored over others, depending upon the physical layout of the machine, the type of sensor used, the type of components used, the desired routing of the pressure signals, and so forth.

Similarly, while some of the components will be on and integrated into the towed implement, others may be either on the implement or on the tow vehicle. For example, processing circuitry, control circuitry, and so forth may be located on a tractor and configured to receive the pressure signals via suitable connectors. For instance, the sensors configured to measure pressure within the fluid conduits may be configured to send a signal to a controller within the tow vehicle for determination of ground engaging tool position. Such a signal may be transmitted through any suitable interface, such as a CAN bus, for example. All such arrangements are intended to be covered by the appended claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating an agricultural implement system, comprising:
   providing a ground engaging tool configured to engage soil in a working position and to disengage the soil in a non-working position;
   providing an actuating cylinder coupled to the ground engaging tool, wherein the actuating cylinder is configured to transition the ground engaging tool between the working position and the non-working position based on a flow of fluid from a fluid supply system;
   receiving, at a controller of the agricultural implement system, a first signal from a first sensor, wherein the first signal is indicative of a first fluid pressure within the fluid supply system; and
   determining, using the controller, whether the ground engaging tool is in the working position or the non-working position based only on the first signal.

2. The method of claim 1, comprising controlling, using the controller, the flow of fluid provided by the fluid supply system to the actuating cylinder coupled to the ground engaging tool to transition the ground engaging tool between the working position and the non-working position.

3. The method of claim 2, comprising increasing fluid pressure supplied to a first side of the actuating cylinder to induce the ground engaging tool to transition to the working position.

4. The method of claim 3, comprising increasing fluid pressure supplied to a second side of the actuating cylinder to induce the ground engaging tool to transition to the non-working position.

5. The method of claim 1, comprising outputting, from the controller, a second signal indicative of whether the ground engaging tool is in the working position or the non-working position based on the first signal from the first sensor.

6. The method of claim 1, comprising comparing, using the controller, the first fluid pressure to one or more threshold values to determine whether the ground engaging tool is in the working position or the non-working position.

7. The method of claim 1, comprising:
   initiating an agricultural product flow while the ground engaging tool is in the working position; and
   terminating the agricultural product flow while the ground engaging tool is in the non-working position.

8. A method of operating an agricultural implement system, comprising:
   receiving, at a controller of the agricultural implement system, a first signal from a first sensor, wherein the first signal is indicative of a first fluid pressure within a fluid supply system;
   receiving, at the controller, a second signal from a second sensor, wherein the second signal is indicative of a second fluid pressure within the fluid supply system, the first fluid pressure corresponds to a fluid pressure within a first side of an actuating cylinder, and the second fluid pressure corresponds to a fluid pressure within a second side of the actuating cylinder;
   controlling, using the controller, a flow of fluid provided by the fluid supply system to the actuating cylinder coupled to a ground engaging tool to transition the ground engaging tool between a working position and a non-working position;
   comparing, using the controller, the first fluid pressure, the second fluid pressure, or a combination thereof, to one or more threshold values; and
   determining, using the controller, whether the ground engaging tool is in the working position or the non-working position based at least in part on the comparison.

9. The method of claim 8, wherein the determination is delayed until the first fluid pressure, the second fluid pressure, or a combination thereof is outside of the one or more threshold values for a threshold duration.

10. The method of claim 8, receiving, at the controller, a third signal indicative of a product delivery mode of operation, wherein the third signal instructs the controller to facilitate an automatic control of an agricultural product flow, a manual control of the agricultural product flow, or a combination thereof.

11. The method of claim 10, wherein the automatic control of the agricultural product flow comprises:
   initiating an agricultural product flow while the ground engaging tool is in the working position; and
   terminating the agricultural product flow while the ground engaging tool is in the non-working position.

* * * * *